2,973,278
MANUFACTURE OF SINTERED VITREOUS SILICA

Gerhard E. Kadisch, 737 Valley Road, Plainfield, N.J., and Arthur Jakubczak, 57 Moffett St., Fords, N.J.

No Drawing. Filed May 15, 1958, Ser. No. 735,375

10 Claims. (Cl. 106—69)

This invention relates to the manufacture of shaped articles of fused silica and provides a novel method of making accurately shaped and formed articles of all kinds such as tubes, pipes, rods, sheets, plates, disks, insulators, crucibles, vessels and linings, to name but a few.

Fused silica has several exceptional properties which make it particularly desirable for numerous important industrial and laboratory applications, such as a low coefficient of thermal expansion, resistance to thermal shock, corrosion resistance, high dielectric strength, and a high transmissivity to ultra-violet and infra-red rays. In the usual method of forming articles of fused silica the silica is first melted and is then cast, drawn or molded to the desired shape. The molten silica is of extremely high viscosity and as a result only a limited number of relatively simple shapes can be formed. Where accurate dimensions are rquired, costly grinding operations must be resorted to.

Attempts have been made to form silica articles by sintering a compacted preform of finely divided fused silica. Since solid fused silica is, however, an unstable, super-cooled liquid of which the stable forms are crystalline, attempts to sinter particles of fused silica have generally resulted in devitrification. Although the ease with which articles of fused silica could be produced by a sintering process has been appreciated, no successful method has yet been devised prior to the present invention.

This invention overcomes the difficulties previously encountered and provides a method of forming articles of fused silica by sintering a compacted body of finely divided fused silica without any appreciable devitrification of the product. In general the invention resides in the incorporation of a minor amount of finely divided boric oxide in intimate admixture with the silica and in enclosing the silica mass during the heating so as to maintain a protective atmosphere around the article itself. The amount of boric oxide that may be used may vary within wide limits but may readily be determined by one skilled in the art by forming sample batches of various amounts and processing them under the conditions to be employed. In general it can be said that the amount of boric oxide should be at least about 1.2 percent based on the weight of silica, or more up to an amount that does not interfere with the sintering step, as by causing the mixture to have too low a melting point, or that interferes with the siliceous character of the sintered article. Present experiments indicate that as much as 15% boric oxide, based on the weight of silica, may be employed, but there is no reason to believe that this is an upper limit.

In forming siliceous articles pursuant to this invention the mixture of silica and boric oxide is preformed to the desired shape and is then enclosed in a heating zone to preserve a protective atmosphere for the article after which it is heated to sintering temperature of between about 1900° F. and 2500° F. The silica and boric oxide may be preformed in many ways. For instance the dry mixture may be pressed in a mold and sintered directly, but preferably the dry material is combined with an inert liquid and a binder to form a plastic composition which is then formed to the desired shape as by casting, pressing or extruding. The formed plastic is first dried, at which stage it may be further processed as by machining, and is then enclosed in a heating zone and fired to sintering temperature.

Finely divided fused silica may be prepared by melting pure quartz, or other form of silica, and then cooling the molten mass to produce an amorphous or vitreous form of silica. The vitreous fused silica is then crushed and ground to an average particle size of about 2–4 microns. To this is added the boric oxide together with a sufficient amount of water or other inert liquid to form a plastic mass suitable for extrusion, casting or pressing, and a binder material capable of preserving the preformed shape prior to sintering, such as wax, paraffin, alginates, methyl cellulose, starch, dextrose, bentonite, water soluble gums, cereal flour, or gelling agents. The plastic mass is then formed and dried to produce a preform. The final article is produced by sintering the preform after it has been enclosed to preserve a protective atmosphere. The preform may be placed in a tightly closed sagger, or it may be packed deeply in fine foundry sand so as not to be exposed directly to the furnace atmosphere.

The temperature at which sintering is to be carried out will depend partly on whether the final product is to be of maximum hardness and density, in which case a high temperature approaching the melting point of silica, e.g. about 2450° F., will be employed. If, on the other hand, an article of lesser hardness and density is desired, a lower temperature, e.g. 2100° F. or lower should be selected. The time at which the temperature is maintained will depend largely on the size and shape of the article, but in any case the time should be sufficient to complete the sintering. After the articles have been fired they should be cooled slowly in the conventional manner and are then ready for use.

Articles produced in accordance with this invention have the same general physical and chemical properties as fused silica, including low coefficient thermal expansion and resistance to thermal shock, resistance to corrosion, and high dielectric strength. Optically they are translucent, probably because of their heterogeneous nature. The products are largely in the form of vitreous silica and only minute traces of crystalline forms of silica are present in the sintered product, as shown readily by X-ray analysis.

It is believed that the articles produced in accordance with this invention consist ultimately of fine particles of which the central portions are pure vitreous silica while the outer surface or skin is a mixture of silica and boric oxide, which serves to bind the particles together in their sintered form. The foregoing explanation is offered by way of hypothesis and is not intended as a definition of the products of this invention. That other explanations may prove more accurate should in no way limit the scope of the present invention.

A preferred embodiment of this invention is described in detail in the following example:

The following ingredients are combined in the following proportions and thoroughly mixed to form a plastic moldable mass:

| | Parts by weight |
|---|---|
| A finely divided substantially pure vitreous silica of particle size less than 3 microns | 95 |
| Boric oxide, hydrated, containing 40% by weight of water | 5 |
| Bentonite clay | 4 to 6 |
| Water | 14 to 16 |

The plastic mass is molded to the desired form, for instance, to the form of a laboratory crucible, and is then dried in an oven at 140° to 150° F. and may then be machined to accurate dimensions. The dried preforms are placed on a thin bed of silica sand in saggers which are tightly closed by a ceramic cover and are then placed in a furnace and fired at 2450° F. for about thirty minutes. The furnace is then shut down and the sintered pieces are permitted to cool slowly in conventional manner. When cooled they are ready for their intended use.

Although this invention has been described with reference to a preferred embodiment, it is contemplated that obvious modifications will occur to those skilled in the art and failiar with this disclosure and that such may be made without departing from the scope of this invention. For instance, numerous molding and casting techniques well known to the ceramics art may be used in making preforms preliminary to the firing of the silica bodies and other techniques for enclosing the bodies during the firing may be used.

It has also been found that the preforms may be fired in an atmosphere of nitrogen or other inert gas with generally satisfactory results.

It is also contemplated that other methods of incorporating boron than the direct addition of boric oxide will prove satisfactory. For instance a vitreous silica preform containing no boric oxide might be fired in an atmosphere containing vapors of a boron compound, such as boron trifluoride. In such a process a born compound could also be incorporated into the silica body to give substantially the same satisfactory result.

Having thus disclosed our invention and described in detail a preferred embodiment thereof, we claim and desire to secure by Letters Patent:

1. The method of making solid siliceous articles consisting essentially of sintered vitreous silica, comprising forming a mixture consisting essentially of finely divided substantially pure vitreous silica and finely divided boric oxide in a minor amount effective to prevent devitrification of the silica, placing the mixture within a heating zone, and heating the mixture in a protective atmosphere to prevent devitrification without melting it to a temperature between about 1900° F. and 2500° F. until the mixture is sintered to a compact vireous solid body.

2. The method of making solid siliceous articles consisting essentially of sintered vitreous silica comprising forming a mixture consisting essentially of finely divided substantially pure vitreous silica and finely divided boric oxide in a minor amount of at least about 1.2 percent by weight based on the weight of silica and effective to prevent devitrification of the silica, placing the mixture within a heating zone, and heating the mixture in a protective atmosphere to prevent devitrification without melting it to a temperature between about 1900° F. and 2500° F. until the mixture is sintered to a compact vitreous solid body.

3. The method of making solid siliceous articles consisting essentially of sintered vitreous silica comprising forming a mixture consisting essentially of finely divided substantially pure vitreous silica, finely divided boric oxide in a minor amount effective to prevent devitrification of the silica, and a binder, shaping said mixture to the desired form, placing the mixture within a heating zone, and heating the mixture in a protective atmosphere to prevent devitrification without melting it to a temperature between about 1900° F. and 2500° F. until the mixture is sintered to a compact vitreous solid body.

4. The method of making solid siliceous articles consisting essentially of sintered vitreous silica comprising forming a mixture consisting essentially of finely divided substantially pure vitreous silica, finely divided boric oxide in a minor amount of at least about 1.2 percent by weight based on the weight of silica and effective to prevent devitrification of the silica, and a binder, shaping said mixture to the desired form, placing the mixture within a heating zone, and heating the mixture in a protective atmosphere to prevent devitrification without melting it to a temperature between about 1900° F. and 2500° F. until the mixture is sintered to a compact vitreous solid body.

5. The method of making solid siliceous articles consisting essentially of sintered vitreous silica comprising forming a plastic mixture consisting essentially of finely divided substantially pure vitreous silica, finely divided boric oxide in a minor amount effective to prevent devitrification of the silica, an inert liquid and a binder, shaping said mixture into a blank of the desired form, drying the blank, placing the blank within a heating zone and heating it without melting it to a temperature between about 1900° F. and 2500° F. until the mixture in a protective atmosphere to prevent devitrification is sintered to a compact vitreous solid body.

6. The method defined by claim 1 wherein the protective atmosphere is provided by substantially sealing the mixture from the furnace atmosphere.

7. The method defined by claim 4 wherein the protective atmosphere consists of an inert gas maintained within the heating zone.

8. The method defined by claim 4 wherein the protective atmosphere is provided by substantially sealing the mixture from the furnace atmosphere.

9. The method defined by claim 5 wherein the protective atmosphere consists of an inert gas maintained within the heating zone.

10. The method defined by claim 5 wherein the protective atmosphere is provided by substantially sealing the mixture from the furnace atmosphere.

References Cited in the file of this patent

UNITED STATES PATENTS

| | | |
|---|---|---|
| 1,181,800 | Randolph | May 2, 1916 |
| 1,420,284 | Rebuffat | June 20, 1922 |
| 1,696,688 | Peiler | Dec. 25, 1928 |

FOREIGN PATENTS

| | | |
|---|---|---|
| 674,247 | Great Britain | June 18, 1952 |